Nov. 25, 1958  J. L. SOLOMON  2,862,114

WELDER CONTROL MECHANISM WITH TIMING MEANS

Filed Oct. 1, 1957  5 Sheets-Sheet 1

INVENTOR.
Julius L. Solomon,
BY
Byron, Hume, Groen & Clement
Attys

Nov. 25, 1958   J. L. SOLOMON   2,862,114
WELDER CONTROL MECHANISM WITH TIMING MEANS
Filed Oct. 1, 1957   5 Sheets-Sheet 2

INVENTOR.
Julius L. Solomon
BY

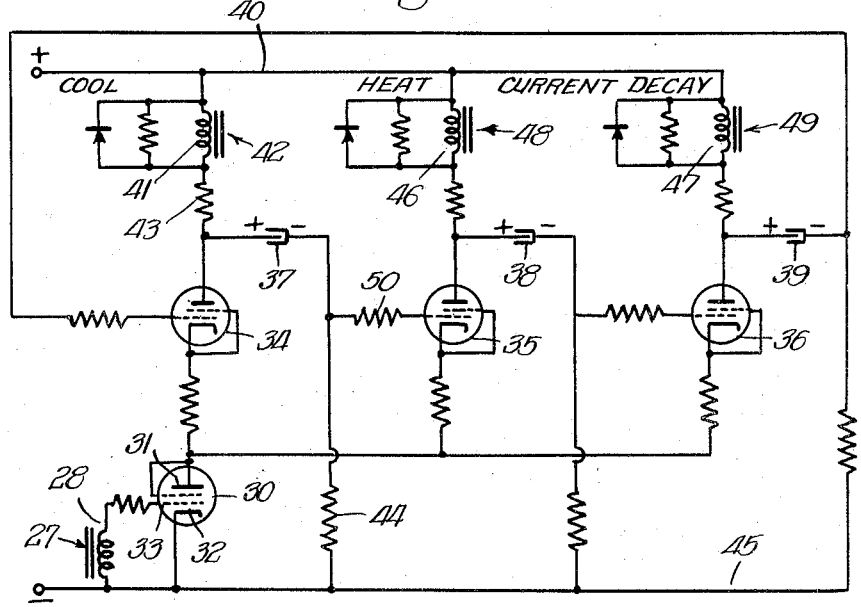
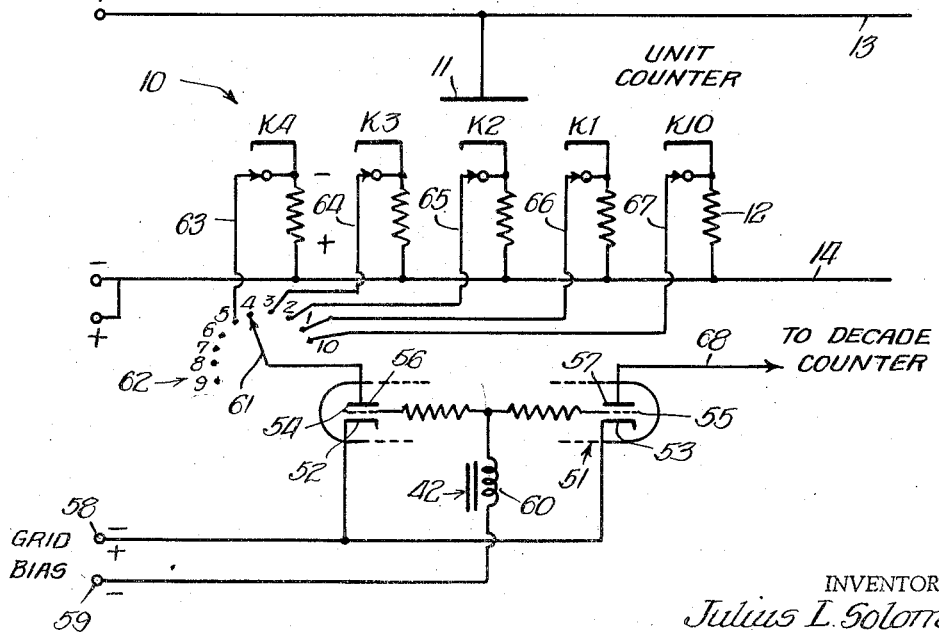

Nov. 25, 1958     J. L. SOLOMON     2,862,114
WELDER CONTROL MECHANISM WITH TIMING MEANS
Filed Oct. 1, 1957     5 Sheets-Sheet 4

INVENTOR.
Julius L. Solomon,
BY
Byron, Hume, Groen & Clement

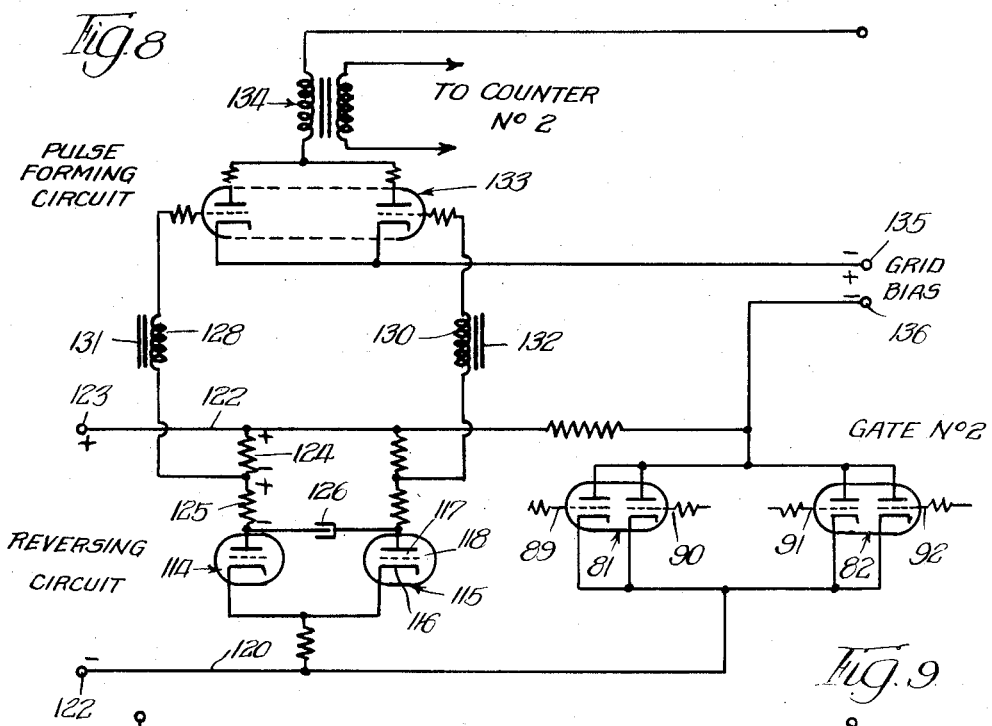
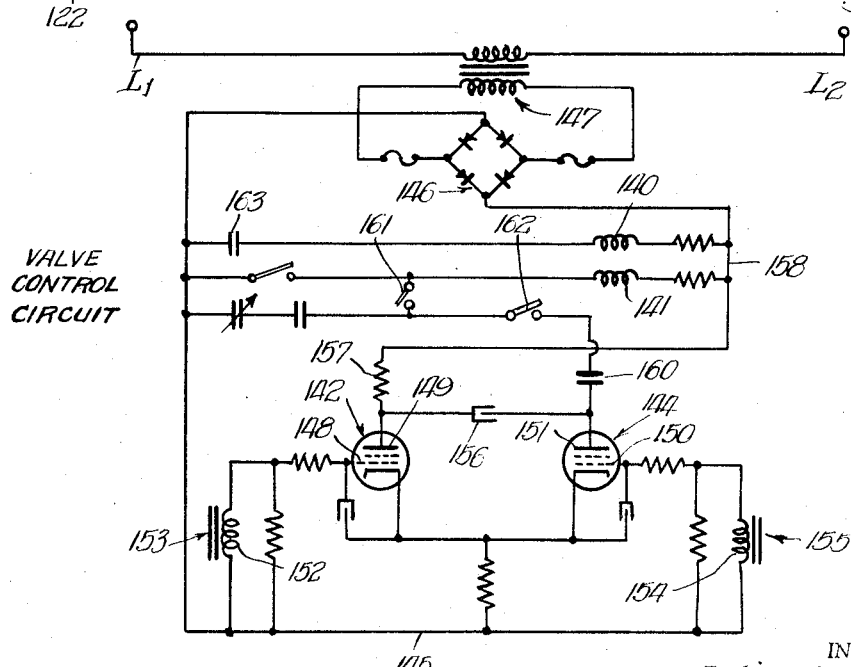

United States Patent Office

2,862,114
Patented Nov. 25, 1958

2,862,114

WELDER CONTROL MECHANISM WITH TIMING MEANS

Julius L. Solomon, Chicago, Ill., assignor to Welding Research, Inc., Chicago, Ill., a corporation of Illinois Application October 1, 1957, Serial No. 687,445

7 Claims. (Cl. 307—112)

The invention relates to control apparatus of the type incorporating electronic circuits for controlling a plurality of functions taking place in sequence and has reference more particularly to control apparatus of this character especially designed for welding machines and having improved sequence timing units with gating circuits whereby the welding periods can be measured in terms of pulses with all other functions being measured in terms of cycles of line frequency.

The process of resistance welding involves a number of variables which are inter-related and whose laws are not exactly known. These variables are the squeeze pressure to which the parts to be welded are subjected, the duration of the squeeze time, the shape and duration of the welding current, the variations in pressure that may be desired during the welding process, and the forging time and force. In the welding of certain materials such as high heat resistance heat-treatable metals as used in aircraft industry, the welding current may consist of a preheat period at a low level, a weld current at a higher level, a quench period during which no current flows, followed by a postheat period also at a low current level. Simultaneously with these operations a series of variable pressures are applied to the work and which includes a high precompression period prior to welding following which the pressure is reduced to that required during the welding period. A forging pressure of increased value may be initiated after termination of the welding current so that said forging pressure may be applied either during the quench period or at the beginning of the postheat period.

From the beginning of the resistance welding art significant progress has been made in welding techniques in the interest of greater accuracy in the control of the welding functions. In the beginning devices utilized for the timing of a welding current were mechanical in nature and with the advent of electronics, electrical and electronic timing and current control devices were utilized. Generally the timing control devices as employed prior to this invention have made use of either vacuum tubes or gas tubes in association with resistance and capacity timing networks. Complete systems were developed using individual timers for operating relays, which were initiated in sequence in accordance with the functional requirements of a particular machine, and in recent years fully electronic circuitry was developed which eliminated to a great extent the use of relays. The resistance-capacity timing circuits utilized in all these controls had definite short-comings and limitations, inasmuch as the generated time delay depends upon the charge or discharge of a condenser through a resistor and the accuracy of the overall timing depended upon the accuracy of these components and the power supply that fed them.

Inasmuch as all resistance welding machines are operated by alternating current power, the frequency of which is maintained within very narrow limits, and inasmuch as the welding current is measured not in actual time duration but in number of cycles passed through the material being welded, it necessarily follows that the most logical type of timer would be one that counts in cycles of the line frequency. Thus, the accuracy of the timing is as accurate as the line frequency and changes in line voltage and the value of components do not affect the timing. Furthermore, the use of one counting element over and over again to count for any number of functions results in the most economical arrangement for a practical sequencing and timing unit of this type.

In a Patent No. 2,813,199, granted November 12, 1957 to Sciaky and Solomon and entitled Sequence Timer, a current cathode type glow transfer tube is employed as the counting element, the said tube having a common anode and a multiplicity of cathodes with guides being located between the cathodes for transferring the glow from one cathode to the next as electrical impulses are applied thereto and thus counted. A voltage is developed across the resistor in the cathode circuit of a particular cathode during the time when it is passing current and thus this voltage may be used in conjunction with an amplifier to develop a signal for purposes of machine control. An additional feature of this sequence counter resides in the cascade arrangement of the counting elements and wherein a plurality may be employed for counting units, tens and hundreds, all in combination with a function stepping circuit. Both the counter and the function stepping circuit have electrical connection with preset means for presetting the counter in advance so that each function or operation is individually timed and whereby such a sequence timing and control unit will time a number of different functions taking place in sequence.

In view of the foregoing, a general object of the invention is to provide improved electronic apparatus for timing the sequencing functions of a machine such as a welder, for example, and which will be relatively simple in design and in principle, having maximum serviceability, and which will exactly time each function without deviation by using sequence timing and control units for counting the natural frequency of the power supply to thereby directly control the function duration.

Another object of the invention is to provide improved electronic apparatus for controlling the functions of a welding machine or similar apparatus and wherein simultaneous operations such as those for the welding of the workpiece and those relating to welding and forging pressures on the workpiece are controlled as to sequence and as to duration, with the duration of each function being accurately timed.

Another and more specific object is to provide novel and improved electronic circuitry for controlling the sequencing functions of a machine such as a three-phase resistance welder, and which will include pulse forming circuits, gating circuits, and at least two sequence timing units, all in electrical association, and operative in a manner whereby one timing unit will control the general sequencing functions of the welder, such as squeeze, weld, hold and off, and whereby the other sequence timing unit will control the firing sequence, such as cool, heat and current decay, for the rectifier tubes of the welding transformer.

Another object of the invention resides in the provision of two or more sequence timing units in electrical association with pulse forming circuits and gating circuits to form apparatus capable of controlling the sequencing functions of a welder and wherein one gating circuit will operate to control the pulse forming circuit which feeds pulses to one sequence timing unit for timing the squeeze, quench, hold and off functions, with the other gating circuit operating to control the second pulse forming circuit having electrical connection with another sequence timing unit for timing the cool, heat and current decay periods during the welding functions.

Another object of the invention resides in the provision of two or more sequence timing units in electrical association with pulse forming circuits and gating circuits as described and wherein one pulse forming circuit is able to accept pulses from two sources, namely, pulses at sixty cycle rate from the power supply and pulses at the repetition rate of cool, heat, current decay sequence, and which are developed at the beginning of each cool time.

With these and other objects in view, the invention may consist of certain novel features of construction and operation as will be more fully described and particularly pointed out in the specification, drawings and claims appended thereto.

In the drawings, which illustrate an embodiment of the invention, and wherein like reference characters are used to designate like parts—

Figure 4 is a wiring diagram illustrating the elements and circuit connections of a function stepping circuit as employed in the present apparatus;

Figure 5 is a wiring diagram illustrating the elements and connections for a resetting circuit for use with the counting device of Figure 3 and the function stepping circuit of Figure 4;

Figure 8 is a wiring diagram showing a reversing, pulse forming and gating circuit;

Figure 9 is a wiring diagram illustrating the elements and circuit connections for the valve initiation circuit employed in connection with the forging operations.

Figure 10 is a view illustrating graphically the secondary welding current as a series of alternating welding impulses; and Figure 11 is a view graphically illustrating the relation of the electrode pressure to a welding impulse.

Figure 1:
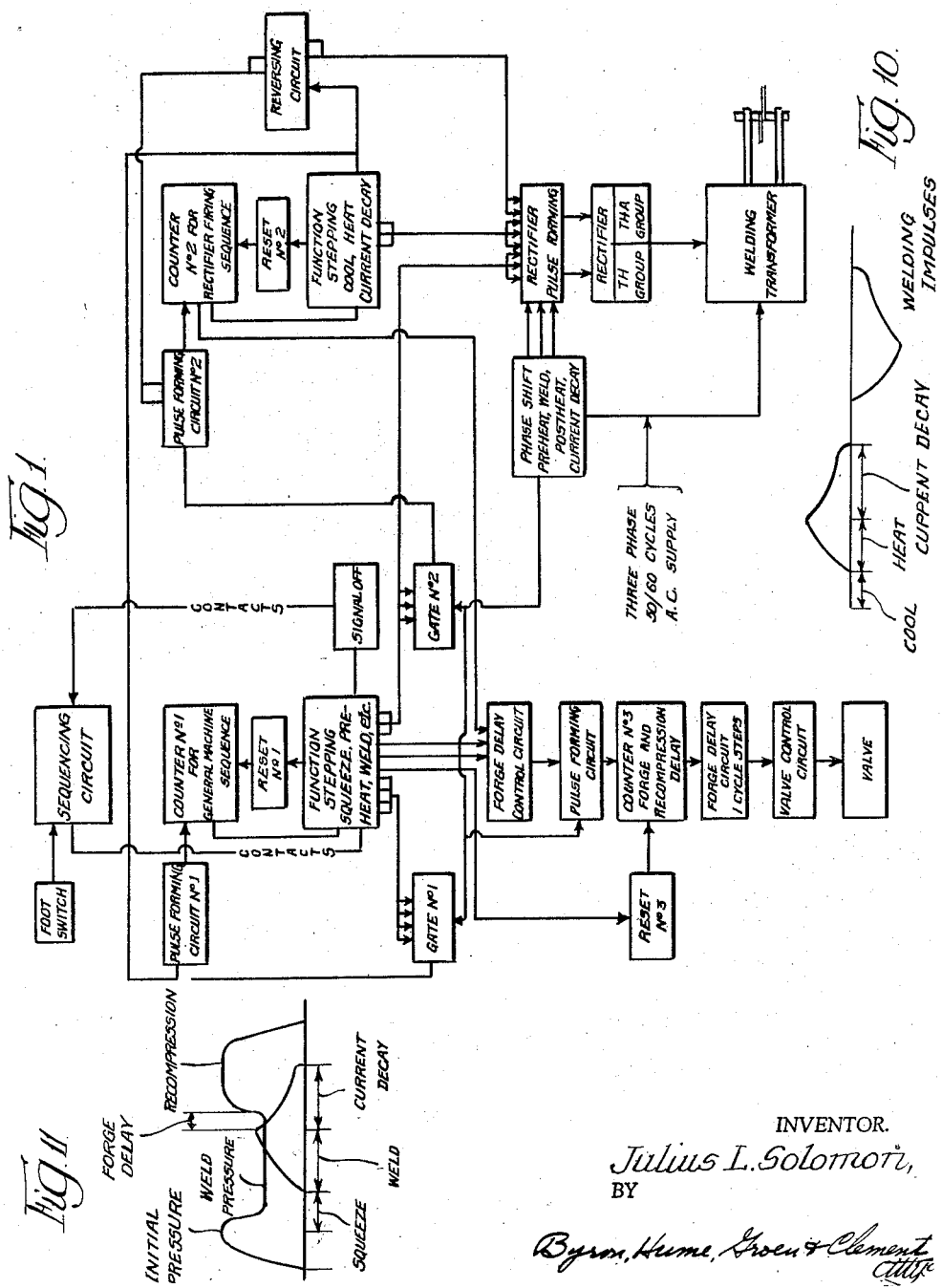
Figure 1 is a block diagram illustrating schematically the basic circuits and the manner in which they are electrically associated and connected to provide apparatus for sequencing and timing the various functions of a three-phase resistance welder.

In the specific control apparatus as illustrated in the block diagram of Figure 1, pulse counting circuits and commutating stepping circuits are utilized in order to obtain the desired sequence of operations. For illustrating the invention a three-phase spot welder has been selected, the same having the following functions, squeeze, preheat, weld, quench, postheat, hold and off time, along with a forge delay timing circuit operating in parallel. All the welding periods are measured in terms of pulses and all other functions are measured in terms of cycles of line frequency. Accordingly there are three periods in the general sequence control during which pulses are counted, and four periods, exclusive of forge delay, which are measured in cycles. The system in general consists of five major divisions, namely, (1) an overall function stepping timing circuit, (2) a cool, heat and current decay timing circuit, (3) a forge delay timing and valve operating circuit, (4) a rectifier pulse forming and firing circuit, and (5) a relay sequence including the time delay, safety, electrode retraction, and foot switch circuits.

Figure 2:
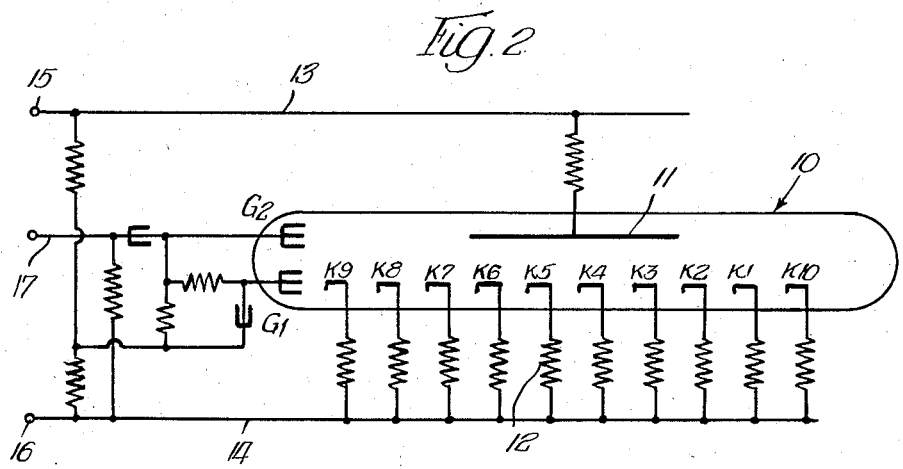
Figure 2 is a wiring diagram illustrating the circuit elements and connections forming a counting element of the sequence timing unit.

The basic counting element employed in the present control apparatus comprises a cold cathode type glow transfer tube indicated by numeral 10 in Figure 2. The same is commonly referred to as a dekatron and has a common anode 11, and a plurality of cathodes K1 to K10 inclusive, and wherein each cathode has a resistor 12 in circuit therewith. The conductor 13 has connection with the anode, whereas, conductor 14 connects with the cathodes and for energizing the tube a suitable direct current voltage is applied across the terminals 15 and 16. Between each cathode there is placed two additional elements called guides and which are identified by G1 and G2. All the guide elements G1 are internally connected together and likewise with respect to guide elements G2, with the terminal for each group extending externally of the tube. When a potential of approximately 400 volts is applied to terminals 15—16, one of the cathodes will become conductive. In the quiescent state the guide elements are maintained at a positive potential above that of the cathodes. If a negative pulse is applied to the terminal 17 the glow will transfer from the cathode energized at the time to the adjacent guide element G1. If, as the pulse is being removed from guide G1, a second pulse is applied to the terminal 17, the glow will transfer from G1 to G2 and as the pulse is removed, the glow will then transfer to the next closest cathode, inasmuch as the guides are maintained more positive than the cathodes. Accordingly, by the application of successive pulses to the guide elements the glow is transferred from cathode to cathode within the tube and during energization of each cathode, when it is passing current, a voltage is developed across the resistor, which may be amplified for delivering a signal for purposes of machine control.

Counting device

Figure 3:
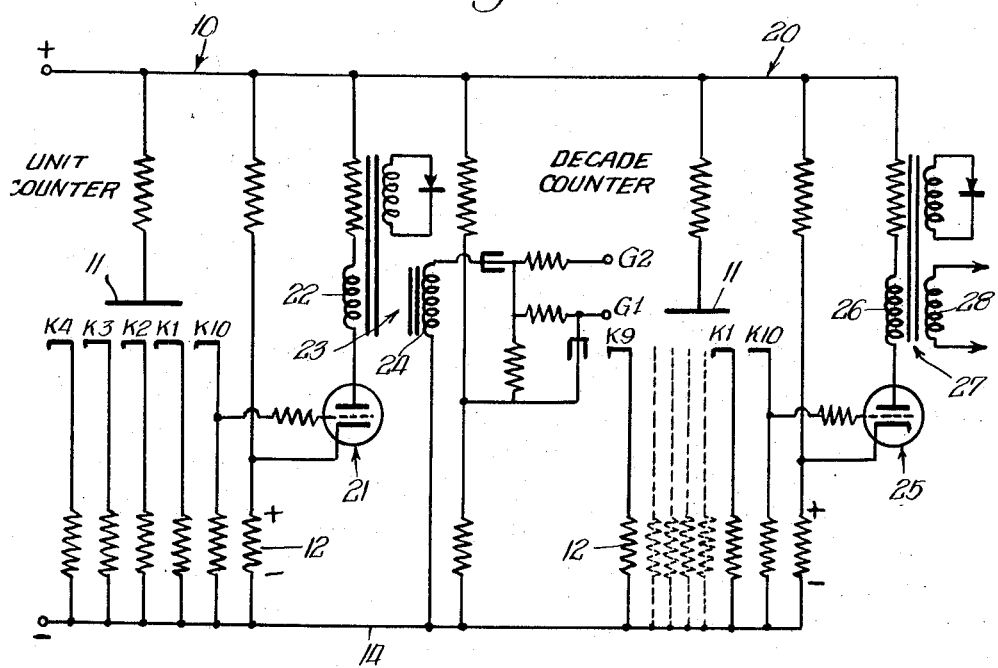
Figure 3 is a wiring diagram illustrating the manner in which a pair of counting elements such as shown in Figure 2 can be electrically connected in cascade to form a unit counter and a decade counter.

Figure 3 illustrates the circuit connections for joining two or more dekatron tubes in a cascade arrangement so that the first tube provides a unit counter, with the second tube forming a decade or tens counters, and when a third tube is used the same forms a hundreds counter. The unit counter in Figure 3 is illustrated in its entirety by numeral 10, with the decade counter being indicated in its entirety by numeral 20. Assuming that pulses from a pulse-forming network are applied to the unit counter 10, then it will be understood that the glow will be transferred from one cathode to the next cathode for each pulse. When the glow is formed at cathode K10 the voltage drop developed across its resistor 12 will lift the potential on the grid of the tube 21 so that it will conduct. The state of conduction of tube 21 generates a pulse across the secondary winding 24 of transformer 23 having the primary winding 22. When the glow leaves cathode K10 and is transferred to the next cathode in line, current flow through tube 21 and through transformer 23 is terminated and a second pulse is accordingly developed across the secondary winding 24. These pulses are delivered to the guides of the decade counter 20, thus effecting a transfer of the glow from cathode to cathode within this decade counter. The cathode K10 of the decade counter 20 is similarly provided with a tube 25 which is caused to conduct when a glow is formed on its cathode K10. In a manner as described, an electrical pulse is generated across the secondary winding 28 of the transformer 27 from the primary winding 26 and also a similar pulse is generated when the glow leaves cathode K10. These pulses may be applied to a third counting element which would thus count in hundreds or the terminals of winding 28 may be connected to a function stepping circuit of the type as shown in Figure 4, which will now be described.

Function stepping circuit

At the end of the count when the glow reaches the last cathode of the last counter the pulse which is formed thereby is delivered to a function stepping circuit such as shown in Figure 4, and which essentially consists of a tube 30 having a plate 31, a cathode 32, and having its grid 33 in electrical connection with secondary winding 28 of the transformer 27. Additional tubes for commutating purposes, such as 34, 35 and 36 are provided and which have their cathodes in electrical connection with the plate 31 of tube 30. When a negative pulse is delivered to the grid 33 of tube 30 the same momentarily stops conduction of this tube, and either tube 34, 35 or 36, whichever may be conducting, the same is momentarily rendered nonconductive. Assuming that tube 34 has been firing, then it will be understood that the grids 35 and 36 will be held negative by the voltage-drop across tube 30. Each condenser 37, 38 and 39, between the plate of its tube and the grid of the next adjacent tube, is provided for stepping the conduction from one tube to the next in the chain. Condenser 37, associated with the plate of tube 34, and which is assumed to be conductive, will be held at a low voltage level. However, with the stopping of conduction in tube 30, the plate of tube 34 is brought to the B-plus potential and condenser 37 starts to charge, the circuit connections for said condenser from the positive conductor 40 including winding 41 of transformer 42, resistor 43, and resistor 44, which in turn has connection with the negative conductor 45. Similar elements are provided in connection with tubes 35 and 36 for the condensers 38 and 39, the primary windings being indicated by numerals 46, 47, respectively, for transformers 48 and 49.

A positive pulse is developed across the grid resistor 50 of tube 25 as a result of the charging of condenser 37, and when grid 33 of tube 30 becomes conductive again, the said tube 35 will be caused to conduct. With each succeeding pulse delivered to the grid of tube 30 the conduction will accordingly step from one tube to the next and thus the circuit can be employed for switching from one function of the welder to the next sequencing function.

Resetting circuits

At the moment conduction starts in either of the tubes 34, 35 or 36 a pulse is developed across transformer winding, either 41, 46 or 47, and this pulse is delivered to a resetting circuit, such as shown in Figure 5, for the purpose of resetting the counting device in advance of the next timing operation for the purpose of timing the desired number of pulses for the next function.

Figure 6:
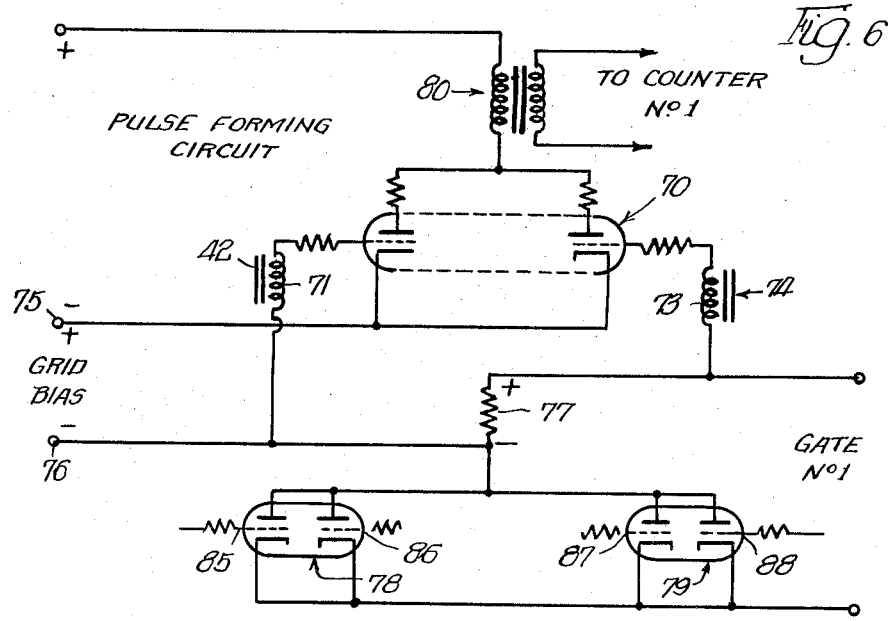
Figure 6 is a wiring diagram showing a pulse forming and gating circuit.

Figure 5 illustrates a part of the unit counter 10, the same having the cathodes K4, K3, K2, K1 and K10 with resistors 12 in circuit therewith. For each of the transformers 42, 48 and 49 the resetting circuit includes a dual triode such as 51 having cathodes 52, 53, respectively, grids 54 and 55, and anodes 56 and 57. A grid bias of suitable potential is applied to terminals 58, 59 and in the grid circuit of the dual triode there is connected in series the secondary winding 60 of the transformer 42. The plate 56 of tube 51 is connected to the tap 61 of a ten-position selector switch 62 which has conductors such as 63, 64, 65, 66 and 67 electrically connecting the terminals of the switch to the cathodes of the unit counter at a location above the resistors 12. The plate 57 is electrically connected through a similar tap switch and in a similar manner to the cathodes of the decade counter 20. Accordingly any particular cathode of the unit counter can be selected by moving tap 61 of the selector switch 62 and likewise any particular cathode can be selected by means of the selector switch for the decade counter. A dual triode tube, similar to 51, with selector switches and connections to the cathodes of both the unit counter and decade counter is provided for transformer 48 and also for transformer 49. At the instant a reset pulse is developed by transformer 42 of the function stepping circuit of Figure 4, the same is applied to the grids of the tube 51 and the glow, as regards the unit counter and the decade counter is immediately transferred to the selected cathodes. If, for example, it is desired to count two hundred thirty-four pulses, the unit counter would be set by the selector switch to the fourth cathode, the decade counter would be set by its selector switch to the third cathode, and the hundreds counter would be set by its selector switch to the second cathode. Pulses generated in a pulse forming and gating circuit, such as Figure 6, are thereupon delivered to the guide elements of the unit counter and after the receipt of two hundred and thirty-four pulses the output circuit of the hundreds counter will deliver a negative pulse to the function stepping circuit, which causes conduction to switch from tube 34 to tube 35. Substantially simultaneously therewith a pulse will be delivered to the reset circuit which will function in a manner to reset the counting elements to the desired preset count for the next function.

Pulse forming circuit

Pulse forming circuit No. 1 is shown in Figure 6. The tube 70 has two sections, one of which is employed to develop pulses at the line frequency rate, with the other section being employed to develop pulses at the rate at which welding pulses are delivered. Winding 71 comprises the secondary of transformer 42 which delivers pulses to the first half of tube 70 at the rate at which the welding pulses are formed in the secondary of the welding machine, whereas winding 73 is the secondary of a transformer 74 which delivers pulses to the second half of tube 70 at the line frequency rate. Both sections of tube 70 are held off by a suitable bias potential applied to terminals 75 and 76 of the grid-cathode circuits for the tube. In series with the grid-cathode circuit of the second section of tube 70 is the plate load 77 for the gating tubes 78 and 79 of gating circuit No. 1. When one of the tubes, either 78 and 79, is made conductive the voltage developed across its plate load 77 overcomes the fixed bias in the grid-cathode circuit of tube 70 so that pulses from transformer 74 cause conduction in the second half of the tube 70 of this pulse-forming network. The resulting pulses are applied to transformer 80 and are thereupon delivered to the guide elements of counter No. 1.

Sequence and gating circuits

Figure 7:
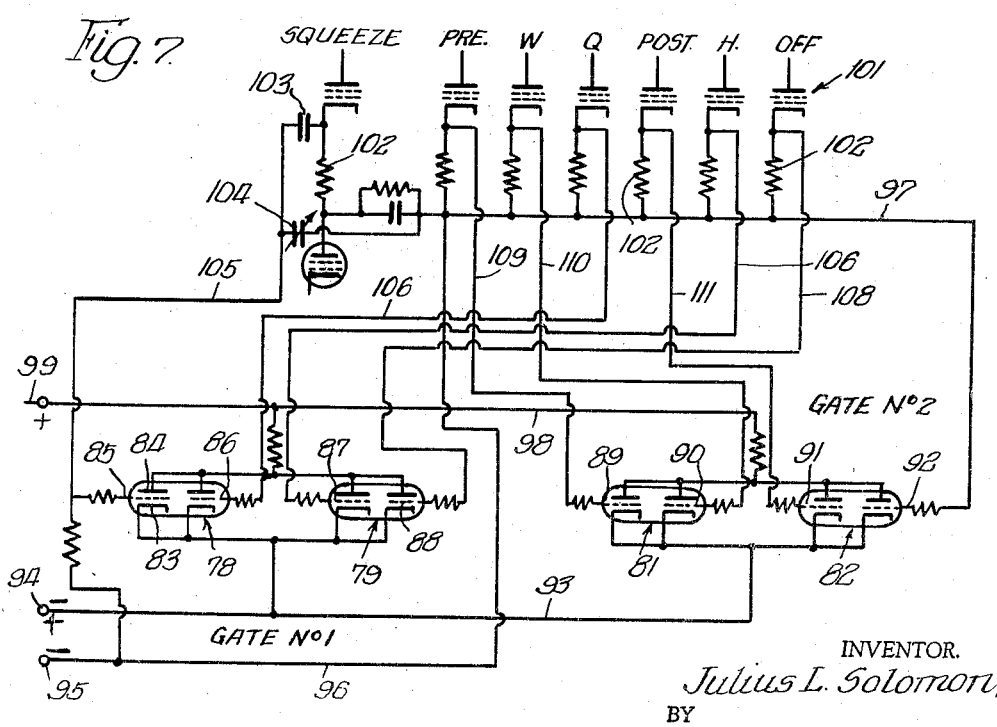
Figure 7 is a wiring diagram showing a function sequencing circuit in electrical connection with No. 1 and No. 2 gating circuits.

In Figure 7 the circuits for gates Nos. 1 and 2, respectively, are shown in electrical connection with a sequencing circuit for the functions of the welder. Gate No. 1 used to control pulses delivered at line frequency rate to the input circuit of counter No. 1. Gate No. 2 is used to control the pulses at line frequency rate delivered to counter No. 2. Pulses generated at the end of each welding impulse are delivered through transformer 42 of Figure 6 to the first section of tube 70 of pulse-forming circuit No. 1, and, of course, these pulses are supplied to counter No. 1 only during the welding periods when gate No. 1 is closed, with gate No. 2 being open. In fact, gate No. 1 is open during those functions which only require counting pulses at line frequency rate. Each gate consists of dual triode tubes such as 78, 79 for gate 1 and 81, 82 for gate 2. Each tube consists of cathodes 83, plates 84, and grids 85 and 86 for tube 78; 87, 88 for tube 79; 89, 90 for tube 81; and 91, 92 for tube 82. All the cathodes 83 of the tubes are connected by conductor 93 to the positive terminal 94 of the bias potential, with the negative terminal 95 being connected by conductor 96 to conductor 97 to which the cathodes 100 of the sequencing tubes 101 are connected. All of the plates 84 of the tubes are connected by conductor 98 having terminal 99 and it will be understood that across terminals 99 and 94 there is applied a suitable plate potential.

The grid-cathode circuit of each tube includes the fixed bias applied to terminals 94 and 95 plus a resistor such as 102 in the cathode circuit of one of the sequencing tubes 101, the various tubes beginning with the one at the left controlling the sequencing of the various functions such as squeeze, preheat, weld, quench, postheat, hold and off. Numeral 103 indicates a normally open contactor, whereas numeral 104 indicates a normally closed contactor. Conductor 105 connects the cathode of the tube 101 for the squeeze function to grid 85 of tube 78. In a similar manner conductor 106 connects the cathode of the tube for the quench function to grid 86. The tubes for the hold and off functions are connected by conductors 107 and 108 to grids 87 and 88, and accordingly, it will be understood that these tubes are all tied to gate No. 1. However, the welding functions are all tied to gate No. 2 and thus conductor 109 connects the cathode of the tube for the preheat function to grid 89, with conductor 110 connecting the cathode for the weld function to grid 90. The cathode for the postheat function is connected by conductor 111 to grid 91 and the conductor 97, to which all the cathodes 100 are joined, has connection with the grid 92.

When this circuit is resting in the squeeze function stage the voltage drop across the cathode resistor 102 for this function brings the grid 85 of tube 78 to the conducting region so that pulses are formed in the output circuit of the pulse-forming network of Figure 6 and which will thus deliver to counter No. 1. Whenever the sequencing circuit of Figure 7 is resting in a stage, either preheat, weld or postheat, which are tied to gate No. 2, it will be understood that pulses will be delivered at line frequency rate to counter No. 2 by the pulse-forming network shown in Figure 8, to be presently described, and through transformer 42 pulses will also be delivered to winding 71 at the end of each welding impulse. These pulses which count the welding impulses are thus delivered to counter No. 1. In a three-phase type of welding machine wherein two groups of half-wave rectifiers are employed for passing current through the primary of the welding transformer in succession, it is necessary to use a reversing circuit to control the switching from one rectifier group to the other. As a result of this mode of operation one welding impulse 112, Figure 10, is positive, whereas the next welding impulse 113 is negative.

Reversing circuit

The reversing circuit of Figure 8 is shown in electrical connection with gate No. 2 and with a pulse-forming network for delivering pulses to counter No. 2. The reversing circuit essentially consists of a pair of thyratrons 114 and 115 each having a cathode 116, plate 117 and a grid 118. The cathodes are joined by conductor 120 to terminal 121 and each of the plates 117 are connected by the conductor 122 to terminal 123. Resistors such as 124 and 125 are interposed between each plate and conductor 122 and it will be noted that the plates are connected to the condenser 126. The thyratrons are thus connected in what is commonly referred to as a flip-flop circuit having a common input to both grids. Pulses received at the end of each heat time period from the cool, heat and current decay function stepping circuit operate in a manner to switch the firing from one to the other of tubes 114 and 115. In order to obtain correct timing for the rectifier firing the pulses delivered to counter No. 2 must be shifted 180 degrees following each welding impulse. This is accomplished by the reversing circuit as described and which is electrically connected to a pulse-forming circuit which includes the secondary windings 128 and 130 of peaking transformers 131 and 132, respectively, which are connected to the grids of the dual triode 133.

The plates of the tube 133 are connected to transformer 134 and accordingly pulses are delivered by the secondary winding of said transformer to counter No. 2. The peaking voltages supplied by the secondary winding 128 to the first half of tube 133 is 180 degrees out of phase with the peaking voltages supplied by the secondary winding 130 of the second half of tube 133. When the reversing section is resting, with conduction taking place through tube 114, the voltage developed in its plate circuit, and which is also in the grid circuit of the first section of tube 133, prevents the peaks produced by winding 128 from making the first section of the tube conductive. However, the second section of tube 133 will be conductive since thyratron 115 is not conducting at this time and accordingly peaks generated in the secondary winding 130 are passed on to transformer 134 and eventually supplied as pulses to counter No 2. When the reversing circuit is switched so that 115 becomes conductive, the peaking voltages generated across winding 128 will be passed on by the conducting first section of tube 133 to transformer 134 and eventually delivered to counter No. 2. The pulses will be passed on by tube 133 to counter No. 2 only when gate No. 2 is open, that is, when either tube 81 or 82 of said gate is conductive, since otherwise the bias potential applied to terminals 135 and 136 is effective to maintain both sections of tube 133 in a nonconductive state.

Operation

In the quiescent state counter No. 2 is at rest in the cool function, Figure 4, with said counting element preset for the cool time count. When the pulse forming gate No. 2 is opened the counter receives pulses which cause the glow to transfer from the preset position as each pulse at line frequency is delivered. At the end of the preset cool time count an output pulse is delivered by the counter to the function stepping circuit of Figure 4, which switches to the heat position. When this switch is made a pulse is delivered to the counter which sets the glow at the proper cathode for the heat time count. Pulses at line frequency rate continue to be delivered to counter No. 2 and after the preset heat time an output pulse is delivered by the counter to the function stepping circuit, which switches from the heat stage to the current decay stage, and simultaneously therewith a pulse is delivered to the counter which presets the glow for the current decay time.

At the end of the proper number of cycles a pulse is again delivered to the function stepping circuit which switches from the current decay stage to the cool stage and one welding impulse such as 112, Figure 10, is completed. At this time a pulse is also delivered to the reversing circuit which switches and shifts the pulses delivered by the pulse forming network of Figure 8 by 180 degrees. Accordingly pulses at line frequency rate operate as described to step counter No. 2 for one welding impulse and automatically reset the same for the next cool time count. The operation continues with the next welding impulse such as 113 being negative and with respect to the positive impulse 112.

The operations as above described take place with gate No. 2 being open and, as previously stated, the said gate is open during the preheating, welding and postheating functions. When gate No. 2 opens it will be understood from Figure 7 that gate No. 1 is closed. However, during this operation of the cool, heat and decay stepping circuit, transformer 42, having location in the cool stage of the circuit will produce a pulse at the end of each welding impulse and through secondary winding 71 of said transformer 42 the pulse is supplied to counter No. 1. The pulse forming circuit No. 1, Figure 6, was previously described as capable of producing pulses at the line frequency rate and also pulses at the repetition rate of the cool, heat, and current decay sequence, the said pulses being developed at the beginning of each cool time. Accordingly through the reversing circuit and the pulse forming circuit of Figure 8, counter No. 2 will time the cool, heat and decay periods for each welding impulse, whereas counter No. 1 will function to count the welding impulses as they are completed, with the preset number taking place for the preheat period, for the welding period, and for the postheating period.

The phase shift circuit shown in the block diagram of Figure 1 operates during operation of counter No. 2 network for the purpose of controlling the magnitude of the current and thus the degree of heat for the several functions, namely, preheat, weld, postheat, and current decay. For a more particular description of such a phase shift circuit reference is made to the Solomon Patent No. 2,600,585 granted June 17, 1952.

For explaining the system controlled by counter No. 1 it will be assumed that with the system at rest the function stepping circuit is in the squeeze stage and that counter No. 1 has been preset for the squeeze time count. The circuit for the squeeze function, as shown in Figure 7, is held closed by means of a manual switch and when this switch is closed current will flow in the circuit, rendering the first section of tube 78 conductive to open gate 1. Pulses will now be delivered by the pulse forming circuit No. 1 at line frequency to counter No. 1. Pulses will be delivered to counter No. 1 until the preset squeeze period is over, at which time an output pulse will be delivered by counter No. 1 to the function stepping circuit of this network for switching the same to the preheat function. A reset pulse is thus delivered to the counter to preset it for the desired number of preheat pulses and simultaneously therewith the preheat stage of Figure 7 is rendered operative. Gate 1 is closed and gate 2 is opened since the first section of tube 81 is now made conductive. The operation switches to counter No. 2 and its network thus times the heat, cool and current decay periods for the preheating and welding functions.

At the end of the preset number of weld impulses the stepping circuit for counter No. 1 will switch to the quenching stage and automatically gate No. 2 will be closed with gate No. 1 being opened. Pulses at line frequency rate are delivered to counter No. 1 for the proper number of cycles for the quench period after which the stepping circuit will move to a postheating stage, and again gate No. 1 is closed, with gate No. 2 being opened for this welding function. At the end of the proper number of postheat impulses counter No. 1 will supply a pulse to its function stepping circuit and said circuit, together with the sequencing circuit will switch to the hold time and automatically therewith gate No. 2 will be closed and gate No. 1 will be opened. At the end of the present number of cycles for the hold time, counter No. 1 will again deliver an impulse to its function stepping circuit which will switch to off time. If the sequence is in non-repeat the system will remain at rest until the foot pedal is released, at which time counter No. 1 will be preset to the selected squeeze time ready for the next welding operation.

The rectifying pulse forming circuit, Figure 1, receives signals from the cool, heat, current delay circuit, and from the reversing circuit and operates in a manner to alternately fire the two groups of rectifiers in the form of ignitron tubes, namely, the TH group and the THA group. Control circuits especially designed for firing the ignitron tubes in a three-phase welding system are disclosed in the Solomon Patents Nos. 2,600,519 of June 17, 1952 and 2,623,204 of December 23, 1952.

*Forge delay circuit*

In a resistance welding machine it is necessary to operate valves for applying air to the pneumatic cylinders which apply force between the electrodes. A high initial pressure, Figure 11, is applied to the electrodes to establish good electrical contact between the electrodes and the parts to be welded. This pressure also irons out irregularities of the surface and simplifies much of the preparatory cleaning. A reduced pressure, approximately one-third to one-half of the initial pressure, is applied during the flow of current for welding. This increases the electrical resistance at the interfaces of the metal, thus providing the most favorable welding condition and a saving of power. The recompression comes in after a time delay following the termination of the welding current. The recompression of the welded parts works or forges the metal to compensate for the metallurgical disturbances caused by the high temperature rise.

The circuit for timing the welding pressure and the recompression consists of a forge delay control circuit, counter No. 3 with a resetting circuit and a pulse forming circuit; a vernier time delay circuit having a one cycle duration, and a valve control circuit. The forge delay control circuit may be initiated in advance of the welding impulse when the machine is used for single impulse welding, as when welding aluminum, or at the end of the last welding impulse, when the machine is used for multiple impulse welding. A pulse at either of these times initiates the forge delay control circuit which opens up a gating circuit, thus allowing pulses at line frequency to be delivered to counter No. 3. At the end of the preset time interval a signal is sent to the forge delay vernier circuit, which times out in one-tenth cycle steps, after which timing a pulse is sent to the valve control circuit for initiating the valve to produce a pressure change for the recompression. The forge delay circuit is turned off by a signal at the end of the hold time and counter No. 3 is preset at the beginning of the squeeze time.

*Valve initiation circuit*

The valve initiation circuit is shown in Figure 9. The upper electrode of a welding machine is actuated by a pressure cylinder wherein one pressure is applied above the piston and a second pressure is applied below the piston. Thus movement of the electrode can be controlled by either exhausting or increasing this second pressure. Upon admitting compressed air to above the piston the upper electrode is caused to move down and to apply initial high pressure to the workpiece. An intermediate welding pressure is obtained by admitting a second pressure below the piston through action of a valve controlled by the valve coil 140. Recompression is obtained by exhausting the pressure from under the piston and which is effected by a second valve controlled by a valve coil 141. The tubes 142 and 144 are connected in a flip-flop circuit, having their cathode circuits joined to the common conductor 145 which is connected to the negative side of a rectifier circuit 146. Circuit 146 is connected to alternating current supply lines L1 and L2 through the transformer 147. The tubes each include a grid and a plate 148, 149 and 150, 151, respectively. The grid 148 is in series with the secondary winding 152 of a transformer 153, whereas grid 150 is in series with the secondary winding 154 of a transformer 155. As a result of the condenser 156, which connects the plates of the tubes, only one tube will conduct at a time so that as pulses are applied by the respective windings 152 and 154 the tubes will be rendered alternately conductive.

The resistor 157 is in series in the plate circuit of tube 142 and a conductor 158 connects the resistor to the positive side of the rectifier supply circuit 146. When tube 142 is conducting coil 141 remains de-energized and likewise coil 140 will be de-energized, provided contactor 163 is open. When a pulse is delivered to the grid of tube 144 said tube will become conductive and in the plate circuit of this tube there is located the normally open contactor 160 and the manual switches 161 and 162. Upon initial starting up of the welding machine the contactor 160 is open so that tube 142 will be the first tube to conduct. After a short time delay contactor 160 closes and the flip-flop circuit is conditioned for operation. When both switches 161 and 162 are closed and with tube 144 conducting, it will be seen that valve coil 141 will be energized. For energizing valve coil 140 it is necessary to close contactor 163, and with tube 142 conducting, the said valve coil is connected across the rectifier supply source. The pulses applied to transformers 153 and 155 are obtained from the forge delay circuit.

What is claimed is:

1. In electronic control apparatus for controlling a plurality of welding functions taking place in sequence, in combination, a first sequence timing unit including a counter, a first function stepping circuit and a reset circuit, said first sequence timing unit having operation to control the welding functions including squeeze, weld, hold and off, a second sequence timing unit also including a counter, a second function stepping circuit and a reset circuit, said second sequence timing unit controlling the firing of the rectifier tubes of the welding transformer to produce cool, heat and current decay periods for each welding impulse, a first pulse forming circuit for the first sequence timing unit, a first gating circuit and which when energized renders the first pulse forming circuit and the first sequence timing unit operative, a second pulse forming circuit, a second gating circuit and which when energized renders the second pulse forming circuit and the second sequence timing unit operative, and circuit means for energizing at any one time either the first or the second gating circuit.

2. Electronic control apparatus for controlling a plurality of welding functions taking place in sequence as defined by claim 1, additionally including a reversing circuit in electrical connection with the second pulse forming circuit and the second function stepping circuit and operative to produce alternating positive and negative welding impulses.

3. In electronic control apparatus for controlling a plurality of welding functions taking place in sequence, the combination with an alternating current power supply, of a first sequence timing unit including a first counter, a first function stepping circuit and a reset circuit, said first sequence timing unit having operation to control the welding functions including squeeze, weld, hold and off, a second timing unit also including a second counter, a second function stepping circuit and a reset circuit, said second sequence timing unit controlling the firing of the rectifier tubes of the welding transformer to produce cool, heat and current decay periods for each welding impulse, a first pulse forming circuit capable of delivering pulses to the first counter at the frequency rate of the alternating current power supply or pulses at the repetition rate of the second function stepping circuit and which are produced thereby at the beginning of each cool period, a first gating circuit and which when energized renders the first pulse forming circuit operative to deliver to the first counter pulses at the frequency rate of the alternating current power supply, a second pulse forming circuit for delivering the second counter pulses only at the frequency rate of the alternating current power supply, a second gating circuit and which when energized renders the second pulse forming circuit operative, and circuit means for energizing at any one time either the first or the second gating circuit.

4. Electronic control apparatus for controlling a plurality of welding functions taking place in sequence as defined by claim 3, additionally including a reversing circuit in electrical connection with the second pulse forming circuit and the second function stepping circuit and operative to produce alternating positive and negative welding impulses.

5. In electronic control apparatus for controlling a plurality of welding functions taking place in sequence, the combination with an alternating current power supply, of a first sequence timing unit including a first counter, a first function stepping circuit and a reset circuit, said first sequence timing unit having operation to control the welding functions including squeeze, preheat, weld, postheat, quench, hold and off, a second sequence timing unit also including a second counter, a second function stepping circuit and a reset circuit, said second sequence timing unit controlling the firing of the rectifier tubes of the welding transformer to produce, cool, heat and current decay periods for each welding impulse, a first pulse forming circuit capable of delivering pulses to the first counter at the frequency rate of the alternating current power supply or pulses at the repetition rate of the second function stepping circuit and which are produced thereby at the beginning of each cool period, a first gating circuit and which when energized renders the first pulse forming circuit operative to deliver pulses to the first counter at the frequency rate of the alternating current power supply, a second pulse forming circuit for delivering to the second counter pulses only at the frequency rate of the alternating current power supply, a second gating circuit and which when energized renders the second pulse forming circuit operative, and circuit means controlled by the first function stepping circuit for energizing the first gating circuit during the squeeze, quench, hold and off functions and for energizing the second gating circuit during the preheat, weld and postheat functions.

6. Electronic control apparatus for controlling a plurality of welding functions taking place in sequence as defined by claim 1, wherein the second pulse forming circuit includes two peaking transformers capable of delivering pulses to the second counter which are 180 degrees out of phase, and additionally including a reversing circuit in electrical connection with the second pulse forming circuit and with the second function stepping circuit, said reversing circuit receiving pulses produced by the second function stepping circuit at the beginning of each cool period and being operative to switch from one peaking transformer to the other on each pulse, whereby accurate timing of the welding impulses is obtained, and said reversing circuit also being operative to produce alternating positive and negative welding impulses.

7. In electronic control apparatus, in combination, a source of alternating current, a first sequence timing unit for controlling the functions of a welder such as squeeze, preheat, weld, postheat, quench, hold and off, said sequence timing unit comprising a counter for counting electrical pulses, a function stepping circuit operated by the counter to effect a stepping from one function to the next at the end of a preset count and a resetting circuit, a second sequence timing unit for controlling the firing of the rectifier tubes of the welding transformer to produce cool, heat and current decay periods for each welding impulse, said second sequence timing unit also comprising a counter, a function stepping circuit and a resetting circuit, a first pulse forming circuit for the counter of the first sequence timing unit and which includes two peaking transformers, one peaking transformer, when operative, supplying pulses at the frequency rate of the alternating current source, the other peaking transformer having connection with the function stepping circuit of the second sequence timing unit and, when operative, supplying pulses at the repetition rate of said function stepping circuit, said pulses being produced thereby at the beginning of each cool period, a first gating circuit and which when energized renders the first peaking transformer operative to supply pulses at the frequency rate of the alternating current source, a second pulse forming circuit for the counter of the second sequence timing unit and which includes two peaking transformers for supplying pulses 180 degrees out of phase and at the frequency rate of the alternating current source, a second gating circuit and which when energized renders the second pulse forming circuit operative, circuit means for energizing at any one time either the first or the second gating circuit, and a reversing circuit in electrical connection with the second pulse forming circuit and with the function stepping circuit of the second sequence timing unit, said reversing circuit receiving pulses from said function stepping circuit at the beginning of each cool period and being operative to switch from one peaking transformer of the second pulse forming circuit to the other on each pulse.

No references cited.